(12) United States Patent
Montagnino et al.

(10) Patent No.: US 6,583,369 B2
(45) Date of Patent: Jun. 24, 2003

(54) SCALE WITH A TRANSIENTLY VISIBLE DISPLAY

(75) Inventors: James G. Montagnino, St. Charles, IL (US); Anson Wong, Glendale Heights, IL (US); Ricardo Murguia, Berwyn, IL (US); Monique Chatterjee, Chicago, IL (US); Elliott Hsu, Chicago, IL (US); Greg Holderfield, Chicago, IL (US); Randall Bell, River Forest, IL (US); Dan Peterson, Chicago, IL (US)

(73) Assignee: Sunbeam Products, Inc., Boca Raton, FL (US)

( * ) Notice: Subject to any disclaimer, the term of this patent is extended or adjusted under 35 U.S.C. 154(b) by 98 days.

(21) Appl. No.: 09/829,716

(22) Filed: Apr. 10, 2001

(65) Prior Publication Data

US 2002/0144845 A1 Oct. 10, 2002

(51) Int. Cl.[7] ................. G01G 23/30; G01G 23/32; G01G 21/22
(52) U.S. Cl. ................. 177/177; 177/178; 177/181; 177/240; 177/262
(58) Field of Search ................. 177/178, 177, 177/181, 238, 239, 240, 262; D10/91

(56) References Cited

U.S. PATENT DOCUMENTS

| 3,128,838 | A | * | 4/1964 | Monk | 177/181 |
|---|---|---|---|---|---|
| 3,811,523 | A | * | 5/1974 | Artwick et al. | 177/238 |
| 3,961,676 | A | * | 6/1976 | Terraillon | 177/178 |
| 4,281,727 | A | * | 8/1981 | Meeks | 177/177 |
| 4,326,596 | A | * | 4/1982 | Beck | 177/178 |
| 4,534,365 | A | * | 8/1985 | Bonetta et al. | 177/177 |
| 4,800,973 | A | * | 1/1989 | Angel | 177/211 |
| 4,893,685 | A | * | 1/1990 | Bergman et al. | 177/174 |
| 5,631,448 | A | * | 5/1997 | Rabinowitz et al. | 177/177 |
| 6,268,572 | B1 | * | 7/2001 | Wilson, Jr. | 177/177 |

* cited by examiner

Primary Examiner—Randy Gibson
(74) Attorney, Agent, or Firm—Lawrence J. Shurupoff

(57) ABSTRACT

A scale with a transiently visible display includes: an enclosure having an upper surface; a measurement device disposed in the enclosure; and a display coupled to the measurement device and attached to the enclosure beneath the upper surface, the display displaying a measurement value only when the display is an active state. Activation of the measurement device places the display in the active state whereas deactivation removes the display from the active state. The enclosure obscures the display from visibility when the display is not in the active state. Optionally, the scale may include a facade beneath the upper surface and a shutter adjacent the facade and covering the display, the shutter being coupled to the measurement device. The shutter opens to reveal the display during activation. The enclosure obscures the facade and the shutter from recognition when the measurement device is not in the active state.

10 Claims, 3 Drawing Sheets

SCALE WITH A TRANSIENTLY VISIBLE DISPLAY

FIELD OF THE INVENTION

The present invention relates to weight scales, and more specifically to a scale having a display that appears only when the scale is in use.

BACKGROUND INFORMATION

Weight scales are well-known in the art. A scale may use one of a variety of weighing mechanisms to measure weight, but most commonly-used weighing mechanisms require placement of the scale on a hard, flat surface such as a bathroom floor. A typical scale is kept flat on a bathroom floor. A scale is a common accessory to a bathroom, and many people weigh themselves in the privacy of their bathrooms before or after bathing. A pervasive feature of personal weight scales is a display or dial which indicates the weight information sought by the user.

Many people consider a scale to be unattractive and unsightly, but nonetheless a necessary bathroom appliance. While many people would prefer not to have a scale be visible in their bathrooms, these people simply may tolerate having a scale be visible for the lack of a better alternative. If the scale is visible, users may prefer that the scale not be identifiable as such. Instead, the scale preferably blends in with the surrounding decor.

It is therefore desirable to create a scale that does not exhibit the visibly identifiable features of a typical scale, thereby avoiding the unsightly appearance of a scale when not in use.

SUMMARY OF THE INVENTION

The present invention provides a weight scale void of visibly identifiable features characteristic of common weight scales, and in particular a weight scale having a display which vanishes when the scale deactivates. By obscuring the display when not in use, a scale in accordance with the present invention does not immediately appear to be a scale, thereby improving its appearance and enhancing its ability to blend with the surroundings. Conceptually, a scale according to the present invention may make the display invisible by matching the display background color with the color of the surrounding surface, and by providing a translucent surface that allows light from an active display to be visible through the translucent surface.

A scale according to an embodiment of the present invention may include a substantially rectangular enclosure with an upper surface upon which a user can stand, a display which is viewable by the user while standing on the scale, a weight measurement mechanism, and circuitry contained within the enclosure. During operation, as when a user is standing on the scale, the display emits a visible indication of the weight measured. In an exemplary embodiment, the display comprises an alphanumeric, multi-segment light emitting diode (LED) display or a back-lighted liquid crystal display (LCD). When not in use, the display is dark and preferably indistinguishable from the portion of the upper surface surrounding the display. In an exemplary embodiment, the upper surface is formed of a darkly tinted translucent plastic, behind which the display is arranged and masked when inactive.

DETAILED DESCRIPTION

Figure 1A:
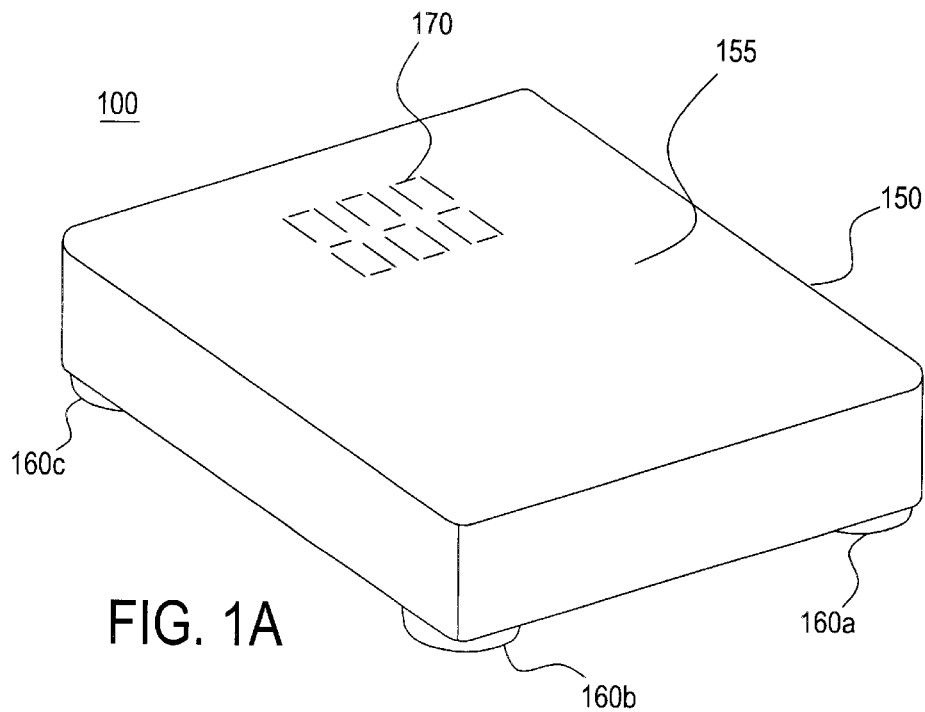
FIG. 1A is a perspective view of an exemplary embodiment of a weight scale according to the present invention.

FIG. 1A shows a perspective view of an exemplary embodiment of a weight scale 100 in accordance with the present invention. The scale 100 comprises an enclosure 150 having a substantially planar upper surface 155 upon which a user can stand. The upper surface 155 preferably is uniformly styled and textured, such as smooth tinted plastic, so as not to be readily identifiable as a scale. However, the upper surface 155 also may be patterned in a way so as to draw attention away from the function of the scale 100 (see FIG. 1F). Note that while the scales 100 shown in FIGS. 1A–1F are rectangular, the scales 100 may well be circular, ovular, hexagonal, or any shape and size reasonably suited to operate as a scale.

The enclosure 150 may rest on four feet 160a–160d (160d not shown) and is coupled in known ways to weight sensing devices (not shown) such as load cells, strain gauges or the like. In an exemplary embodiment, the weight sensing devices generate electrical signals indicative of the weight applied thereto. Conventional load cells and strain gauges known to those skilled in the art can be used in accordance with an embodiment of the present invention. The signals from the weight sensing devices are then processed to generate an indication of the applied weight. Exemplary circuitry for accomplishing this is described more fully below in connection with FIG. 2. The weight sensing devices also may include any other suitable weighing mechanism known in the art, including mechanical implementations.

The feet 160 may be adjustable for leveling purposes. The feet 160 may be simple pads, if using, for example, strain gauges, or they may be load cells if using electronic sensors.

The scale 100 includes a display 170 that preferably is placed on the scale at a location of which the user has an unobstructed view, such as centered on the upper surface 155 of the enclosure 150. The display 170 may have a digital or analog format and may be electrical or mechanical. An electrical implementation of the display 170 may include, for example, a liquid crystal display (LCD) with back-lighting or a multi-segment light-emitting diode (LED) display. The characteristics of an LCD may be varied, such as having white lettering against a black background, black lettering against a white background, or black lettering against a color-tinted background (e.g., green, blue). Reversing the contrast on an LCD or varying the back-lighting may create additional desirable effects.

Figure 1B:
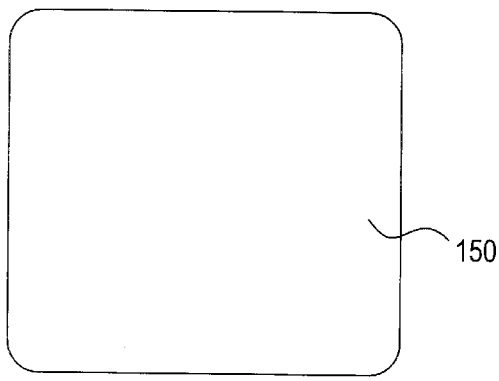
FIGS. 1B and 1C are plan views of the exemplary weight scale of FIG. 1A in inactive and active states, respectively.
Figure 1C:
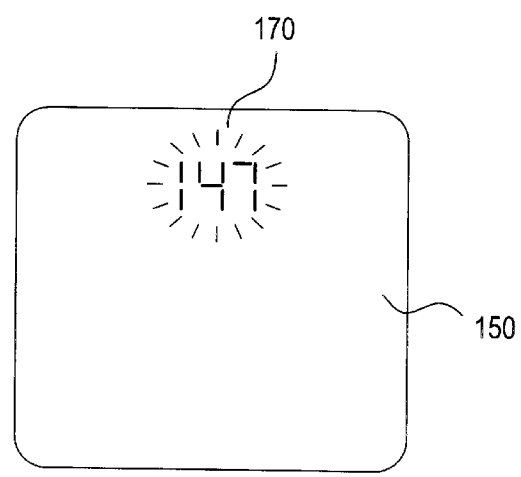
Figure 1D:
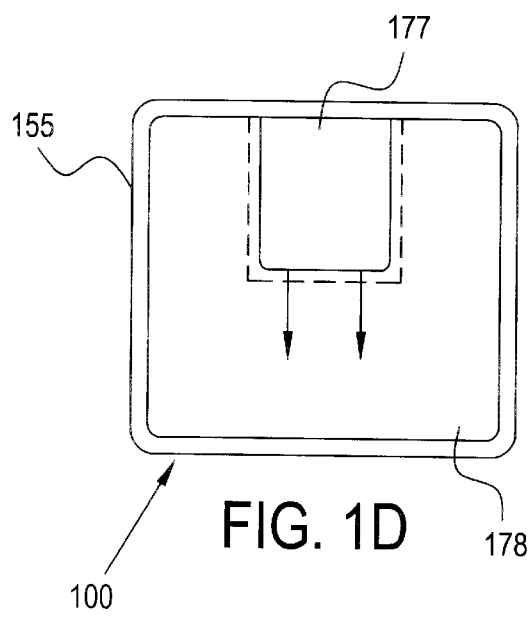
FIGS. 1D and 1E are plan views of an another exemplary embodiment of a weight scale according to the present invention, shown in inactive and active states, respectively.
Figure 1E:
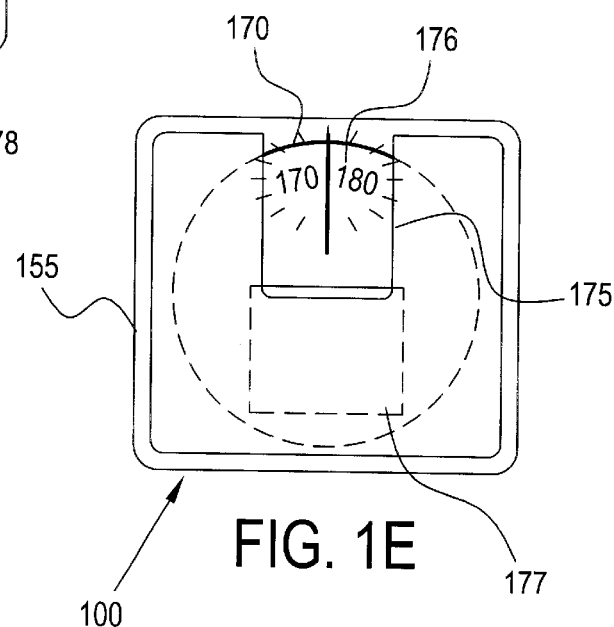

Preferably, the upper surface 155 is formed of a darkly tinted translucent plastic, behind which the display 170 is arranged and masked when inactive. In such a situation, the display 170 appears hidden because insufficient ambient light passes through the upper surface to illuminate the display 170 when the display (or its back-lighting) is off. By contrast, when the display 170 is on, the display 170 can be seen because the light from the display 170 is emanating from immediately behind the upper surface 155, contrasting against a dark interior (not shown) of the scale 100. To the extent reasonably feasibly, the enclosure 150 preferably is self-contained and sealed against light entering from underneath, which might then partially illuminate the display 170 in the inactive state. As such, when the display 170 is inactive, the display 170 can neither be seen nor identified as a display, as shown in FIG. 1B, yet when the display 170 is active, the display 170 can be clearly seen, as shown in FIG. 1C.

In the event that a lighter shade of translucent material is desired for the enclosure 150 of the upper surface 155, based on personal decor choices, more ambient light may pass through the upper surface 155 above the display 170, potentially illuminating it and undesirably revealing it. This may be minimized by camouflaging the internal components of the enclosure 150, such as painting it the same color as the material chosen for the external housing of the enclosure 150. As such, even directly transparent materials may be used as well.

While the use of lighter-shaded translucent materials above the display 170 is possible, the material may need to be smoked, fogged or clouded if one wishes to avoid direct transparency, which may reveal the display 170. While this may work for individually illuminated LED displays 170, such as shown in FIG. 1C, materials that are both tinted and smoked may not be suitable for use with mechanical scales 100 using dials 175 (shown in FIG. 1E) because the material may blur the appearance of numbers 176 on the dials, which typically will not be individually illuminated. A separate backlight (not shown) may be necessary to illuminate the dial 175 through the upper surface 155.

Mechanical scales 100 may need to use almost transparent materials above the displays 170 so that the numbers 176 on the dials 175 are clear and discernable when actively lighted. The use of such transparent materials may reveal, however, the display 170 below it, unless other means are used to obscure the display 170 when inactive. Because this situation is more apt to occur the context of mechanical scales 100, the solution preferably also is tailored to the nature of a mechanical scale 100, which includes a weighing mechanism (not shown) having a system of moving parts that adjust the dial 175 as the user puts weight on the scale 100. In particular, the initial pounds of weight applied to the weighing mechanism may cause an internal shutter 177 (shown in FIG. 1D in a closed position) to open, revealing the dial 175 beneath the shutter 177 (shown in FIG. 1E in an open position). The shutter 177 may blend into a facade 178 that masks the presence of the shutter 177 in the closed position.

Numerous variations on the shape, size, and mechanics of the shutter 177 and facade 178 are conceivable and choice of the shutter 177 and facade 178 characteristics would be within the skill of one of ordinary skill in the art. Preferably, the shutter 177, the facade 178 and the intersection of them would be indiscernible through the transparent material used for the upper surface 155, while permitting the upper surface 155 to remain uniformly colored, blended, or tinted. For example, the facade 178 may include a thick layer of paint beneath the upper surface 155, and the shutter 177 may include a thin plastic sheet painted with the same paint as the facade 178.

The use of a facade 178 or the shutter 177 may also be implemented with a digital display 170. For example, a facade 178 that has an identical color as the LED or LCD display 170 may be used in conjunction with one of a clear upper surface 155, a smoked upper surface 155, and a frosted semi-transparent upper surface 155. As with the mechanical scale 100 embodiments, the facade 178 may take a variety of forms, such as an interior coat of paint, paint on the underside of the upper surface 155, or an inner sheet or plate below the underside of the upper surface 155.

Figure 2:
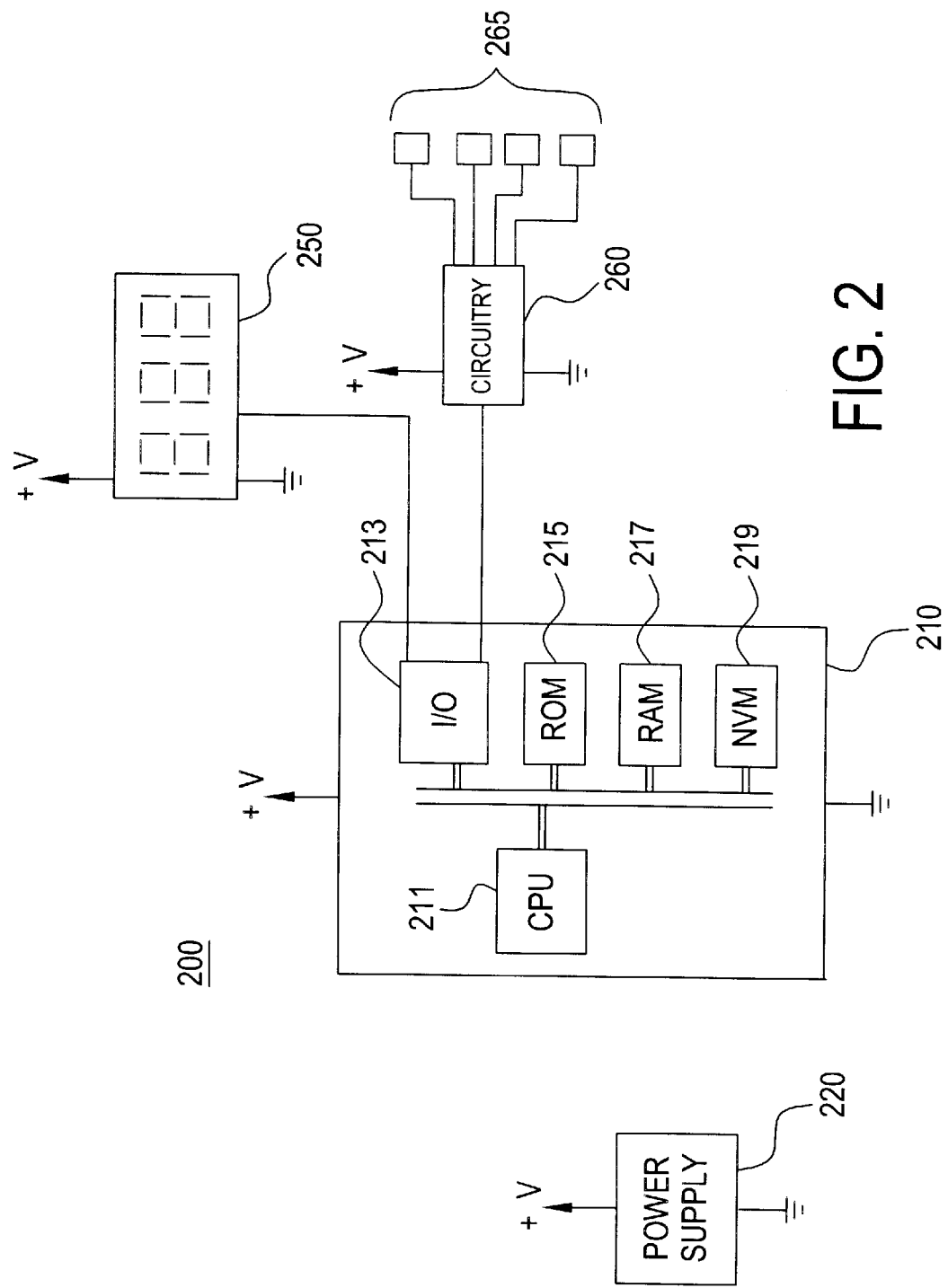
FIG. 2 is a schematic block diagram of the circuitry for an exemplary weight scale in accordance with the present invention.

FIG. 2 is a schematic block diagram of an exemplary embodiment of a circuit 200 for use in the scale 100. The circuit 200 is contained within the enclosure 150 and may be implemented on a printed circuit board or the like. The circuit 200 comprises, for example, a microcontroller 210 coupled to weight sensors 265, via circuitry 260, a display 250 and a power supply 220. The microcontroller 210, which may be implemented on an individual integrated circuit, includes a central processing unit (CPU) 211, input and output (I/O) ports 213, read-only memory (ROM) 215, random-access memory (RAM) 217, and non-volatile memory (NVM) 219, such as electrically-erasable programmable ROM (EEPROM). The ROM 215 contains program instructions that the CPU 211 executes to effectuate the operation of the circuit 200. The RAM 217 is used to temporarily store intermediate results used by the CPU in the execution of the program instructions. The NVM 219 is used to store data that is to be retained even when power is removed from the circuit. Such data may include user-related information such as a history of weight measurements, and/or user-identifying information.

The weight sensors 265 may be arranged, in a known way, adjacent to or in the feet 160 of the scale. The circuitry 260 is coupled to the weight sensors 265 and generates one or more signals that can be processed by the I/O apparatus of the microcontroller 210. Although the circuitry 260 can be implemented in a variety of ways, the implementation of this circuitry is conventional. For example, in an exemplary embodiment, the circuitry 260 generates an analog signal indicative of the weight sensed by the sensors 265 and the I/O block 213 of the microcontroller includes an analog-to-digital (A/D) converter. In an another embodiment, the circuitry 260 may include the A/D converter.

The microcontroller 210 is coupled to and controls the display device 250 in a known way. The microcontroller 210 may also control the activation of any back-lighting that the display 250 may have, as in the case of an LCD implementation. The microcontroller 210 may control each segment of the display 250 individually or may provide the display device 250 with a three-digit number. The details of the interface between the microcontroller 210 and the display device 250 are an implementational choice.

In operation, the CPU 211 periodically samples the I/O block 213 to determine whether a weight has been sensed by the sensors 265. If the CPU determines that a weight has been sensed, it will convert the detected signal into a weight measurement which it provides to the display device 250 for display. The CPU 211 will also cause the display device 250 (and/or its back-lighting) to be activated so that it can be seen.

In an alternative embodiment, the microcontroller 210 can be placed initially in a sleep mode, so as to preserve power. The presence of a signal from the circuitry 260 can generate a wake-up signal that causes the microcontroller 210 to be activated. The microcontroller 210 may then activate the display device 250.

Once the user has stepped off the scale, the microcontroller 210 may then de-activate the display device 250, thereby causing it to become invisible. Such deactivation can occur, for example, an interval of time (e.g., 1–30 seconds) after the user has stepped off the scale.

Figure 1F:
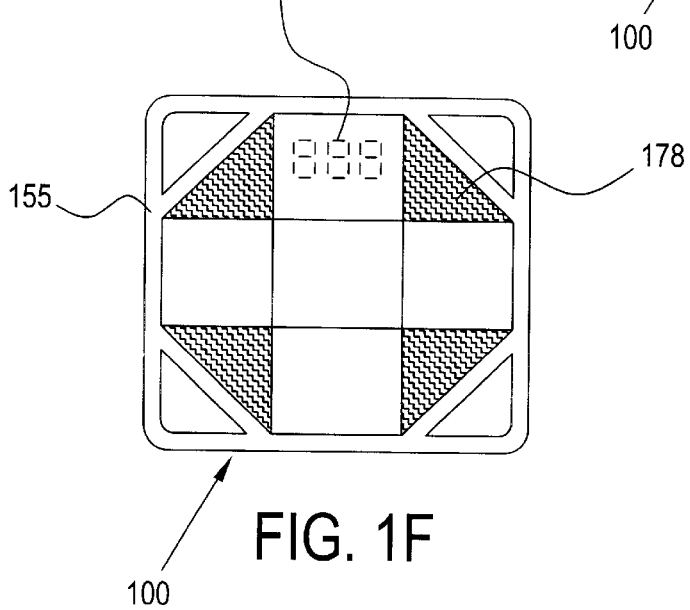
FIG. 1F is a plan view of an ornamentally patterned exemplary embodiment of a weight scale according to the present invention.

The power supply 220 which may include, for example, batteries, a power outlet, solar cells 179 (shown in FIG. 1F), or the like. Batteries may be recharged by connection to, for example, a power outlet or by the solar cells. To add a stylish effect, the solar cells 178, which often appear bluish, shiny, and silvery, may be arranged within the upper surface 155 in a mosaic pattern or the like, as shown in FIG. 1F, to mask their functionality with ornamentality, while likewise disguising the display 170.

A number of embodiments of the present invention have been described above. Nevertheless, it will be understood that various modifications may be made without departing from the spirit and scope of the invention. Accordingly, other embodiments may be within the scope of the following claims. It is intended that all matter contained in the above description or shown in the accompanying drawings shall be interpreted as illustrative and not in a limiting sense. It is also understood that the following claims are intended to cover all of the generic and specific features of the invention herein described and all statements of the scope of the invention, expressed or implied.

What is claimed is:

1. A scale comprising:
   an enclosure having an upper surface;
   a measurement device disposed in the enclosure; and
   a display coupled to the measurement device and attached to the enclosure beneath the upper surface, the display displaying a measurement value only when the display is an active state;
   wherein activation of the measurement device places the display in the active state;
   wherein deactivation of the measurement device removes the display from the active state; and
   wherein the enclosure obscures the display from visibility when the display is not in the active state.

2. The scale according to claim 1, wherein the upper surface includes a translucent material.

3. The scale according to claim 2, wherein the display further includes one of a light emitting diode (LED) panel disposed below the translucent material and a liquid crystal display (LCD) panel disposed below the translucent material.

4. The scale according to claim 2, wherein the translucent material forms a portion of the upper surface of the enclosure.

5. The scale according to claim 2, wherein the translucent material forms substantially all of the upper surface of the enclosure.

6. The scale according to claim 1, wherein the measurement device includes one of a load cell unit and strain gauge unit.

7. The scale according to claim 1, comprising a control circuit disposed in the enclosure and coupled to the display and to the measurement device.

8. The scale according to claim 7, wherein the control circuit includes:
   a microcontroller coupled to the measurement device; and
   a power supply coupled to the microcontroller.

9. The scale according to claim 8, wherein the microcontroller includes:
   a central processing unit;
   an input/output interface; and
   a memory;
   wherein the memory includes executable instructions for predefined programs to be executed by the central processing unit.

10. The scale according to claim 9, wherein the memory includes a nonvolatile memory storing data when the measurement device is in an off state.

* * * * *